F. L. DEWEY.
GANG PLOW.
APPLICATION FILED JUNE 29, 1914.
1,149,900.
Patented Aug. 10, 1915.
3 SHEETS—SHEET 3.
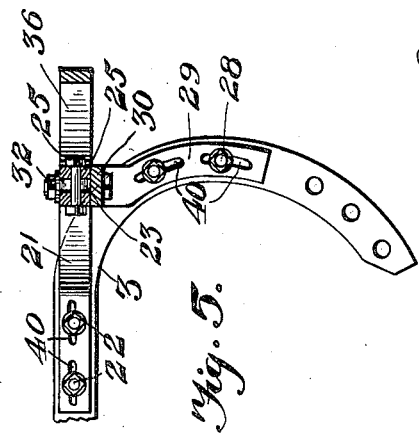
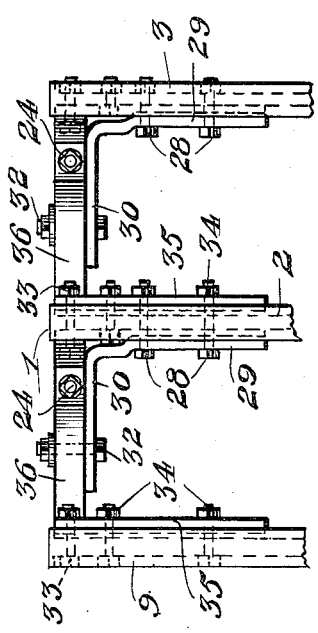
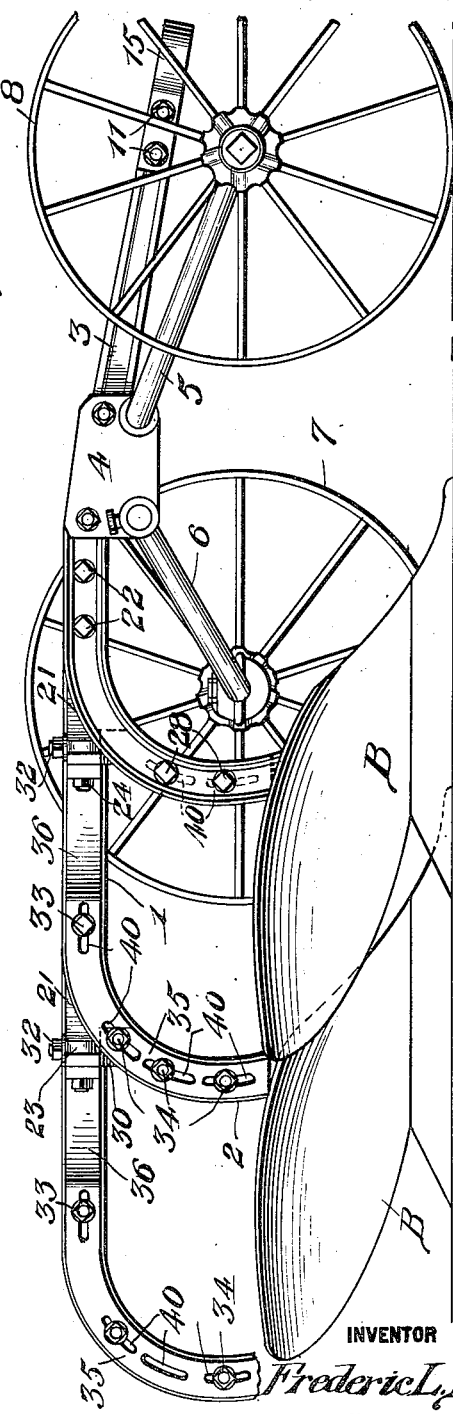
WITNESSES:
Ray Fortenbach
Charles W. Gray
INVENTOR
Frederic L. Dewey.
BY
William C. Linton.
ATTORNEY

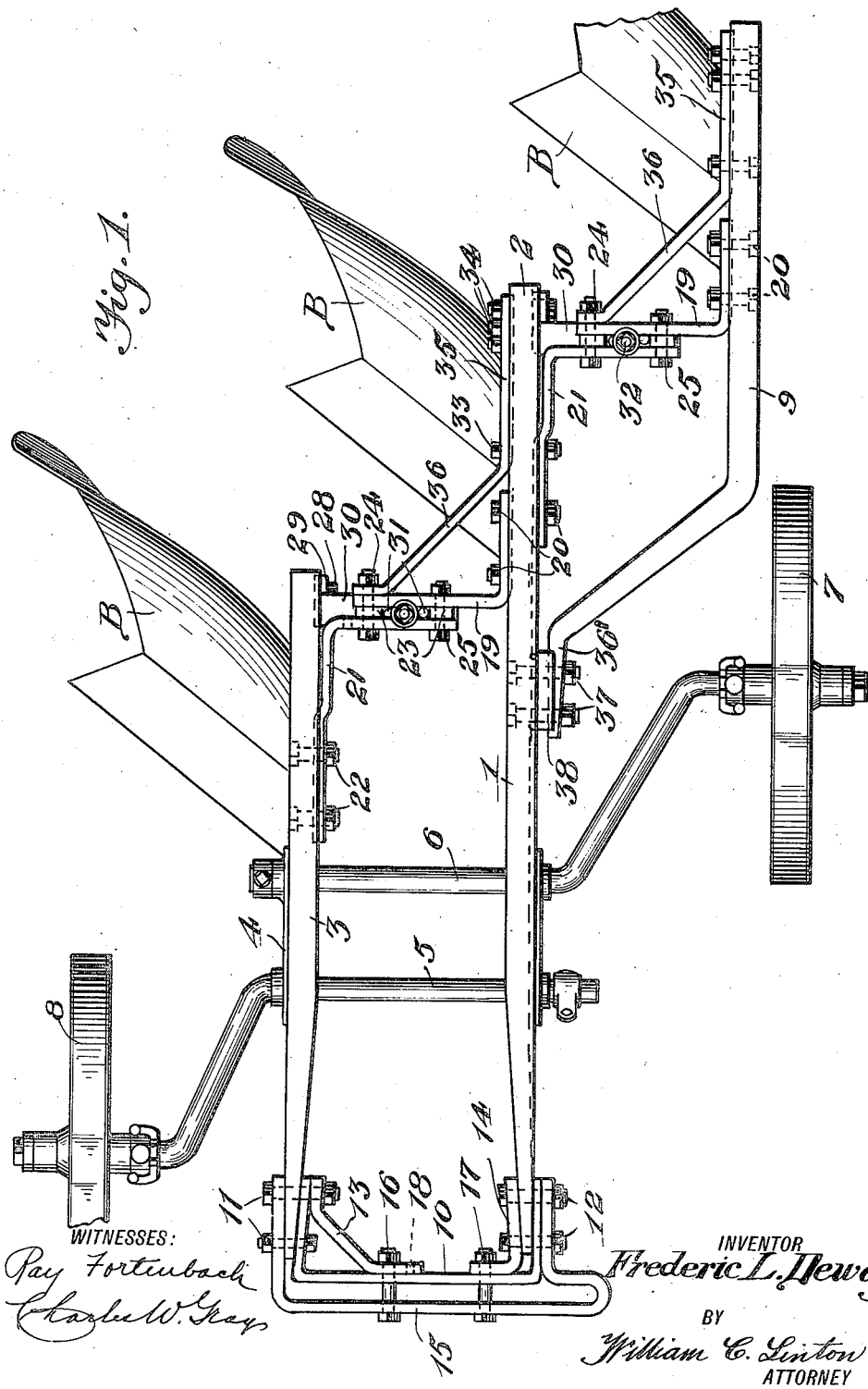

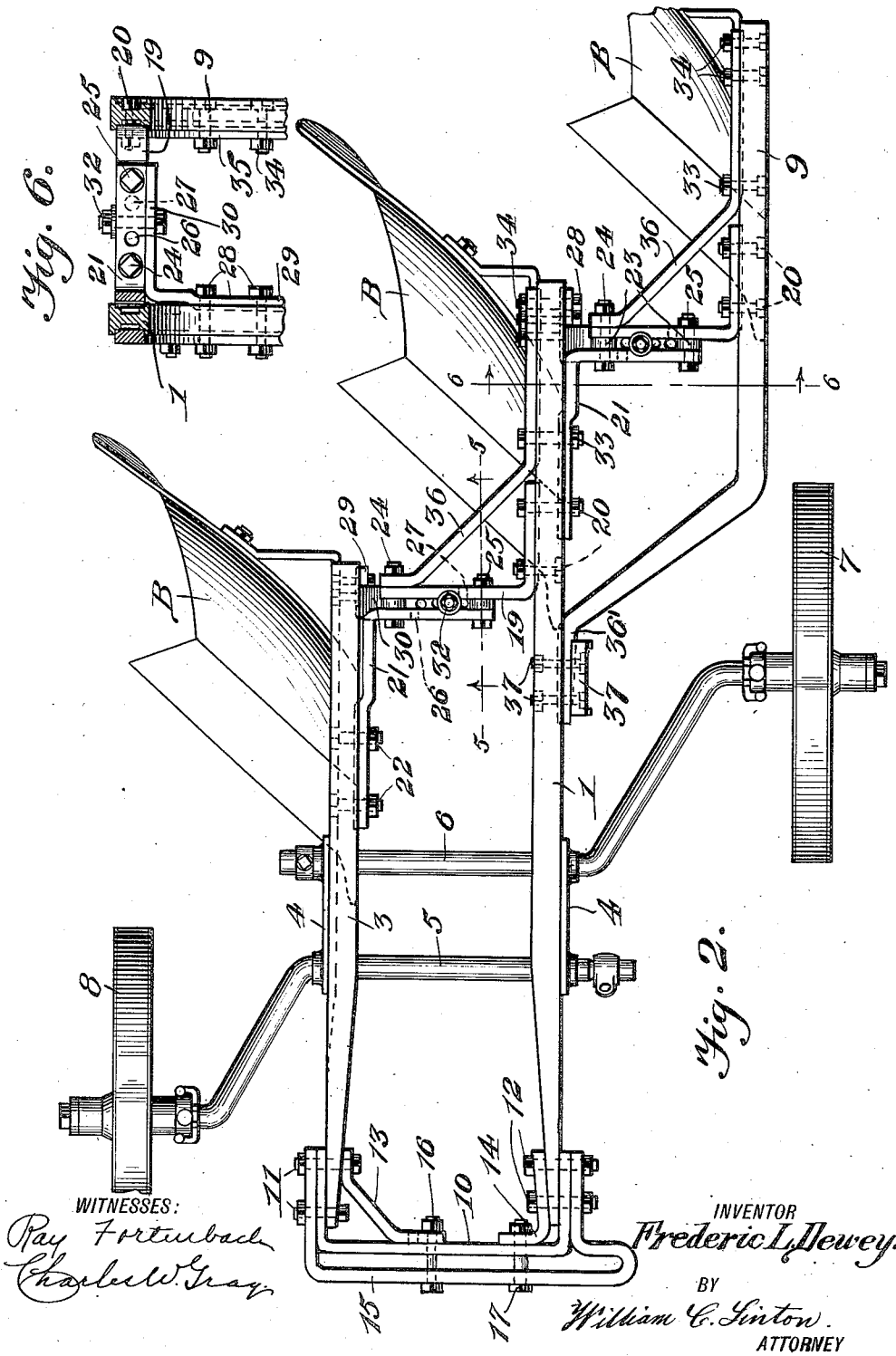

UNITED STATES PATENT OFFICE.

FREDERIC L. DEWEY, OF CANTON, ILLINOIS, ASSIGNOR TO PARLIN & ORENDORFF COMPANY, OF CANTON, ILLINOIS, A CORPORATION OF ILLINOIS.

GANG-PLOW.

1,149,900.   Specification of Letters Patent.   Patented Aug. 10, 1915.

Application filed June 29, 1914. Serial No. 848,045.

*To all whom it may concern:*

Be it known that I, FREDERIC L. DEWEY, a citizen of the United States, residing at Canton, in the county of Fulton and State of Illinois, have invented new and useful Improvements in Gang-Plows, of which the following is a specification.

The present invention relates to plows, and more particularly to gang plows, which are designed for doing very heavy work. Gang plows of this type are generally equipped with plow bottoms of a certain standard size, but it often occurs that on the same field or farm different sized plow bottoms are required to obtain the desired results. In applying different sized plow bottoms to a gang plow frame the beams have to be adjusted laterally as when plow bottoms change in size they also change in width, and therefore, the plow bottoms should be held the proper distance apart to properly till the ground.

The present invention seeks to provide a frame for gang plows of this type whereby plow bottoms of various sizes may be attached thereto for plowing various depths without the necessity of having several plow frames with different sized plow bottoms.

Another object of the invention is to provide a frame for gang plows of this character which may be readily and easily adjusted to permit the various sized plow bottoms to be attached thereto and which will be strong, durable, and efficient when in use.

It is another object of the invention to improve devices of this type of sundry details hereinafter pointed out.

The preferred means by which I accomplish my objects are illustrated in the accompanying drawings, and are hereinafter specifically described.

In the drawings: Figure 1 is a plan view of a gang plow embodying my invention. Fig. 2 is a similar view showing the plow beams in an adjusted position when smaller sized plow bottoms are applied thereto. Fig. 3 is a side elevation of the same having parts thereof broken away. Fig. 4 is a rear elevation of Fig. 2. Fig. 5 is a detailed vertical section on the line 5—5 of Fig. 2. And, Fig. 6 is a detailed section on the line 6—6 of Fig. 2.

In the drawings like and corresponding parts are designated by similar reference characters throughout the several views.

The numeral 1 indicates the central beam of a gang plow frame having a horizontal medial portion and a downwardly curved rear end portion 2 to which is secured a plow bottom B. A side beam 3 similar to the central beam 1 also carries a plow bottom B and is adapted to be rigidly and adjustably connected to the central beam 1 by means as will be hereinafter more fully described.

Journaled within bearings 4 carried by the mentioned beams are crank axles 5 and 6 respectively upon which are mounted the ground wheel 7 and the furrow wheel 8 which support the frame of the plow. In gang plows of this character means are used for raising and lowering the plow bottoms and such means are connected to the crank axles 5 and 6, but are not shown in the drawings as they do not form any part of the present invention.

When it is desired, a beam 9 similar to the beams 1 and 3 carrying a plow bottom B may be connected to the plow frame or any number of such beams may be connected in a like manner to correspond with the number of plow bottoms desired.

In Fig. 2 of the drawings is shown a gang plow having smaller sized plow bottoms which are generally known as fourteen-inch plow bottoms, and it often occurs that larger sized plow bottoms are necessary in the same field or farm for plowing deeper, and as stated, in the outset of the invention, it was an object to provide a frame whereby various sized plow bottoms may be attached thereto.

In Fig. 1 of the drawings I have illustrated the frame in an adjusted position wherein larger sized plow bottoms are used than that shown in Fig. 2, and which are commonly known as sixteen-inch plow bottoms. To apply various sized plow bottoms to a gang plow frame the beams should be adjustable laterally, as when the plow bottoms change in size they also change in width. That is, when fourteen-inch plow bottoms are applied to the frame the beams should be fourteen inches apart, and likewise when sixteen-inch plow bottoms are secured to the frame, the beams should be sixteen inches apart.

The connection between the forward ends of the beams 1 and 3 comprises a U-shaped bar 10 having its end portions resting upon the outer faces of the beams and secured thereto by means of the bolts 11 and 12, as shown in Fig. 2. This bar 10 is also braced to the beams by means of the angle bars 13 and 14 respectively. A bar 15 is also secured to the beams 1 and 3 by means of the bolts 11 and 12 and lies parallel with the bar 10, but is held in spaced relation therewith. The bolts 16 and 17 extend through the bars 10 and 15 and connect the angle braces 13 and 14 thereto. The construction as described provides a thoroughly rigid connection between the forward ends of the plow beams, which may also be used for attaching a clevis or similar hitching device for connecting the pulling power to the plow. In adjusting the forward end of the beams one end of the U-shaped bar 10 is fastened at one end to the inner face of the beam 3 by means of the bolts 11, as shown in Fig. 1, and the bolt 16 extends through the opening 18 formed within the angle brace 13 for fastening the same to the bar. From this it is obvious that the beams 1 and 2 may be adjusted at their forward ends to either position as described, and at the same time have a thoroughly rigid structure.

The connection between the rear ends of the beams comprises an L-shaped bar 19 having one arm thereof secured to one face of the beams 1 by means of the bolt 20 and a similar L-shaped bar 21 has one arm thereof secured to the inner face of the beam 3 by means of bolts 22. The outer arms of the bars 19 and 21 extend laterally from the beams and are held in spaced relation by means of blocks 23 through which extend bolts 24 and 25 respectively whereby the bars may be locked together. In adjusting the rear end of the plow beams the bolts 24 and 25 are removed and inserted within the openings 26 and 27 respectively formed within the bars 21 and 10 and there again the bars may be rigidly locked together. Secured by means of bolts 28 to the downwardly curved portion of the beam 3 is the curved end 29 of a bracing bar having an angular extension 30 upon which rest the lateral portions of the bars 19 and 21. The lateral portion 30 of this bar is provided with a plurality of openings 31 through one of which extends a bolt 32 for locking the portion 30 of the bar to the bars 19 and 21. This bolt 32 may be inserted through any one opening formed within the portion 30 of the brace bar for locking the bars together as described, or any number of similar bolts may be used for making a more rigid locking connection. Secured to one face of the downwardly curved portion 2 of the beam 1 by means of the bolts 33 and 34 respectively is the curved portion 35 of a bracing bar. The free end 36 of this bar extends outwardly and is secured to the bars 19 and 21 by means of the bolt 24.

In plowing with gang plows of this character, the plow bottoms travel very deep within the ground and a great deal of strain is exerted upon the plow beams, having a tendency to force them together or force one above the other; and by arranging the bars as described a thoroughly rigid connection is provided, which will prevent the beams from being forced apart or weaken the frame.

In the foregoing I have described a gang plow having only two plow bottoms, but when it is desired to add three or more bottoms to the same plow frame, the plow beams may be attached to the beam indicated by the numeral 9. The rear end of this beam is rigid and adjustably connected to the rear end of the beam 1 by a similar connection used between the rear ends of the beams 1 and 3, and therefore, a detail description is not necessary. In attaching this beam 9 to the frame the bolts 20, 33 and 34 which connect the bars 19 and 35 in place may extend through the beam 1 and fastening the bars 21 and 29 of the connection between the beams 9 and 1 as shown.

The forward end of the beam 9 is offset and provided with an extension 36' which rests within the channel of the outer face of the beam 1 and is locked thereto by means of bolts 37. A block 38 rests upon the outer face of the portion 36' of the beam 9 and is also secured thereto by means of the bolts 37 when the frame is in the position as shown in Fig. 2. But when it is desired to adjust the forward end of the beam 9 the block 38 is inserted between the portion 36' of the beam 9 and the outer face of the beam 1 as shown in Fig. 1. By this construction the forward ends of the supplemental beams may be rigidly and adjustably connected to the main frame.

In applying more than one beam carrying a plow bottom to frames of this character the clevis or hitching device should be laterally adjusted upon the front end of the frame and by extending the bar 15 across the front of the plow frame in spaced relation to the bar 10 a clevis or hitching device may be adjustably connected thereto, as is common with gang plows of this character.

The beams used in connection with gang plows of this character are generally channeled on their opposite faces as better illustrated in Fig. 6, and the bars for connecting and bracing the rear ends of the beams together rest within the channeled faces of the beams, which also assists in holding the bars in place. The nuts carried by the various bolts for connecting the bars and beams together may also rest within these channels. The portions of the bars which are connected to the plow beams are provided with elongated slots 40, as shown, whereby any irregularities due to the manufacture of the plow beams may be taken up in securing the bars in place.

From the foregoing it is obvious that I have provided an adjustable connection between the beams whereby various sized plow bottoms may be attached and the beams will be held in proper spaced relation to permit the plow bottoms to till and scour the soil without interfering with the operation of the adjacent plow bottom.

I claim:

1. A plow, the combination with parallel beams, a plow body carried by each beam, means for adjustably locking the rear ends of the beams together, means for adjustably locking the forward ends of the beams together, comprising a U-shaped bar adapted to be secured to the sides of the beams adjacent to the forward ends thereof substantially as described.

2. A plow, the combination with a pair of beams, a plow body carried by each beam, means for adjustably connecting the ends of the beams together, comprising a U-shaped bar adapted to be connected to the outer sides of the beams, angle bars secured to the inner sides of the beams and to the U-shaped bar substantially as and for the purpose specified.

3. A gang plow, comprising channeled beams, plows carried thereby, bars extending laterally from the beams, one end of said bars being adjustably mounted within the channel of the beams and means for adjustably connecting the opposite ends of the bars together for the purpose specified.

4. A gang plow, comprising beams having plows connected thereto, bars connected at one end to said beams and extending laterally therefrom, means for adjustably connecting the bars together, a movable bar connected to one beam, and said first mentioned bars, and an angle bar connecting the lateral portions of said bars and one of the beams substantially as described.

5. A gang plow, comprising parallel beams each having a horizontal and downwardly curved portion, plows carried by the said beams, bars rigidly connected to the horizontal portions of the beams and extending laterally therefrom, means for adjustably locking the bars together, a bar rigidly secured to the downwardly curved portion of the beams and extending laterally therefrom and means for adjustably locking the last mentioned bar to the bars extending from the horizontal portion of the beams.

6. A gang plow, comprising channeled beams each having a horizontal and downwardly curved portion, plows carried by the beams, bars rigidly connected at one end to said beams, means for adjustably connecting the opposite ends of said bars and holding the same in spaced relation, a bar rigidly connected within the channel of the downwardly curved portion of the beams and extending laterally therefrom, and the lateral portion of said bar having means adjustably mounted between the first mentioned bars for locking the bars together.

7. A gang plow, comprising channeled beams, plows carried thereby, bars adjustably secured to said beams, each having a portion thereof extending laterally therefrom, means for adjustably securing said lateral portions together and holding the same in spaced relation thereby forming a slot therebetween, a bar adjustably secured at one end to said beam and having a lateral extending portion, the lateral extending portion of the first mentioned bars being adapted to rest upon the lateral extending portion of the other said bar, means extending through said slot for adjustably securing said bars together, and an angle bar adjustably connected to one of said beams and to said bars substantially as and for the purpose specified.

8. A gang plow comprising channeled beams, plows carried thereby, means for adjustably locking the beams together, a supplemental beam having a plow secured thereto, means for connecting the rear end of the supplemental beam to the channeled beams, a block mounted within the channel of one of the beams, the forward end of the supplemental beam being offset and adapted to rest upon said block for holding the supplemental beam in one adjusted position, said block being adapted to rest upon the outer face of the supplemental beam whereby the same may assume another adjusted position and means for locking the supplemental beam and block to the channeled beams.

9. A gang plow comprising channeled beams each having a horizontal and downwardly curved portion, plows carried by the beams, angular bars each having one end adjustably mounted within the channels of the horizontal portions of the beams, means for adjustably locking the free ends of the bars together, bars having curved portions adjustably mounted within the channels of the downwardly curved portions of the beams, angular extensions formed with the curved portions of said bars, the free ends of the angular bars adapted to rest upon the angular extensions and means for adjustably locking said second mentioned bars together.

In witness whereof, I hereunto subscribe my name to this specification in the presence of two witnesses.

FREDERIC L. DEWEY.

Witnesses:
W. C. SANDERS,
C. H. CORTELYOU.